P. W. JENSEN.
HALTER.
APPLICATION FILED DEC. 6, 1919.

1,340,271.

Patented May 18, 1920.

Inventor.
P. W. Jensen.

UNITED STATES PATENT OFFICE.

PETER W. JENSEN, OF PRINCETON, MINNESOTA.

HALTER.

1,340,271.  Specification of Letters Patent.  Patented May 18, 1920.

Application filed December 6, 1919. Serial No. 342,938.

*To all whom it may concern:*

Be it known that I, PETER W. JENSEN, a citizen of the United States, residing at Princeton, in the county of Millelacs and State of Minnesota, have invented certain new and useful Improvements in Halters, of which the following is a specification.

This invention is a halter for cattle and has for its object the provision of an inexpensive, strong and durable halter which may be easily fitted upon the head of the animal and which will, when in position, be comfortable but efficient to prevent straying of the animal.

The invention is illustrated in the accompanying drawings, in which—

Figure 1:
Figure 1 is a perspective view of a halter constructed in accordance with my invention and illustrating the position of the device when in use.
Figure 2:
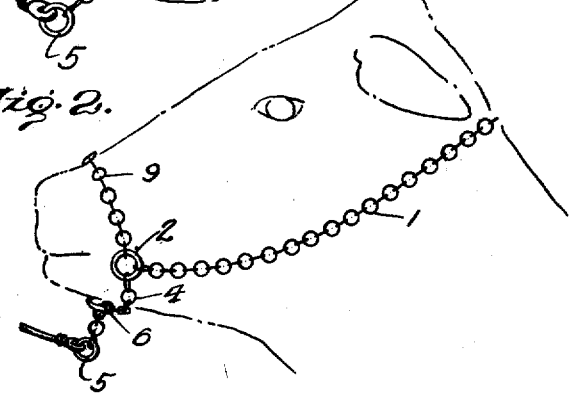
Fig. 2 is a side view of the same.

The headstall consists of a chain 1 which is connected at one end to a ring 2 and equipped at its opposite end with a snap hook 3. A second chain 4 is also connected to the ring 2 and is equipped at its free end with a ring 5 to which a hitching or leading strap may be attached, the intermediate portion of the chain 4 passing through a ring 6 as shown. A third chain 7 connects the ring 6 with a third ring 8 and a chain 9 extends between the rings 8 and 2, the said chain 9 when the device is in position passing over the upper jaw and nose of the animal as illustrated.

The headstall chain 1 is passed over the neck of the animal back of the ears and the rings 2 and 8 are disposed at the sides of the animal's cheeks so that the nose chain 9 will be held in its proper position. The snap hook 3 is passed through the ring 8 and then carried up and engaged in one of the links of the chain 1, the headstall being thus very easily adjusted to the size of the animal's head. The lower portion of the chain 4 and the third chain 7 connected to the ring 6, through which the chain 4 passes, constitute a throat chain which passes under the lower jaw of the animal so that the halter will be effectually held in place but the chain 4 may move freely through the ring 6 so that the halter will readily yield to the movements of the animal's head in feeding or exercising without becoming detached.

My improved halter is obviously simple and inexpensive, may be easily fitted upon the animal, and is strong and durable.

Having thus described the invention, what is claimed as new is:

1. A halter comprising a chain constituting a head stall to pass over the neck and head of the animal, a second chain passing under the lower jaw of the animal and connected at one end with an end of the headstall chain, a nose chain extending from the connection between the first-mentioned chains and loosely connected with an intermediate portion of the headstall chain, and a chain connecting the nose chain loosely with an intermediate portion of the second-mentioned chain.

2. A halter for cattle comprising a headstall chain adapted to pass over the neck and around the head of the animal and equipped at one end with a snap hook, a ring secured to the opposite end of the said chain, a nose chain extending from said ring over the nose of the animal, a second ring carried by said nose chain and through which the headstall chain is engaged, a chain extending from said second ring under the lower jaw of the animal, a ring at the free end of said last-mentioned chain, and a chain attached at one end to the first-mentioned ring and extending loosely through the last-mentioned ring and having its free end adapted to a hitching strap.

In testimony whereof I affix my signature.

P. W. JENSEN. [L. S.]